(12) United States Patent
Lewis (10) Patent No.: US 10,407,124 B2
(45) Date of Patent: Sep. 10, 2019

(54) ELLIPTICAL DRIVE SYSTEM

(71) Applicant: Mark Zeb Lewis, Union, OR (US)

(72) Inventor: Mark Zeb Lewis, Union, OR (US)

( * ) Notice: Subject to any disclaimer, the term of this patent is extended or adjusted under 35 U.S.C. 154(b) by 148 days.

(21) Appl. No.: 15/731,468

(22) Filed: Jun. 14, 2017

(65) Prior Publication Data
US 2018/0361196 A1    Dec. 20, 2018

(51) Int. Cl.
| | |
|---|---|
| *B62M 1/26* | (2013.01) |
| *A63B 22/20* | (2006.01) |
| *A63B 22/06* | (2006.01) |
| *A63B 23/04* | (2006.01) |
| *A63B 22/00* | (2006.01) |
| *B62K 25/00* | (2006.01) |

(52) U.S. Cl.
CPC ......... *B62M 1/26* (2013.01); *A63B 22/0664* (2013.01); *A63B 22/203* (2013.01); *A63B 23/04* (2013.01); *A63B 22/00* (2013.01); *B62K 25/00* (2013.01)

(58) Field of Classification Search
CPC ................................. B62M 1/24; B62M 1/26
See application file for complete search history.

(56) References Cited

U.S. PATENT DOCUMENTS

| | | | |
|---|---|---|---|
| 7,967,313 B1 * | 6/2011 | Eggert .................... | B62K 5/02 280/224 |
| 9,975,600 B2 * | 5/2018 | Chou ....................... | B62M 1/26 |
| 2003/0001350 A1 * | 1/2003 | Eschenbach ........... | B62K 3/002 280/63 |

\* cited by examiner

*Primary Examiner* — Michael C McCullough
(74) *Attorney, Agent, or Firm* — Chen-Chi Lin (57) ABSTRACT

An elliptical drive system for stepper type bikes that needs no chains or sliders for its operation. Its quadrilateral linkage minimizes the vertical motion of the user's feet while guiding the feet in a natural motion that resembles walking. The elliptical drive system is designed to give the stepper bike high ground clearance for traveling on rough terrain. Adjustment apertures on the linkage arms allow the user to adjust the length of linkage arms according to the user's leg length and overall size.

6 Claims, 8 Drawing Sheets

ELLIPTICAL DRIVE SYSTEM

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of human powered systems and more specifically to an elliptical drive system for a stepper type bike.

Numerous designers have developed and patented stepper bikes where the rider is in a standing position and presses his feet down on pedals to create forward motion. The primary objective is to have the user's feet travel in an elliptical fashion, similar to a stationary elliptical training machine found in many gyms or private homes.

BRIEF SUMMARY OF THE INVENTION

Another object of the invention is to provide an elliptical drive system that eliminates the need for low hanging frame members, allowing for suitable ground clearance when operating on rough terrain.

A further object of the invention is to provide an adjustable linkage geometry that allows for optimal pedal path for different riders.

Yet another object of the invention is to provide a quadrilateral linkage that minimizes the vertical motion of the rider's feet, while guiding the feet in a natural motion, similar to that of walking.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an elliptical drive system comprising: left and right rear crank arms, left and right pedal platforms, left and right main horizontal drive arms, left and right vertical drive arms, left and right short horizontal drive arms, left and right short lower drive arms, main horizontal frame member having an integral upwardly angled frame extension, U shaped horizontal frame member, front fork and steering member, a rear wheel hub, said front fork and steering member rotatably attached to said main horizontal frame member, said left and right short horizontal drive arms rotatably attached to said upwardly angled frame extension, said left and right vertical drive arms rotatably pinned to the ends of said short horizontal drive arms, said left and right short lower drive arms rotatably pinned at one end to said main horizontal frame where said horizontal member meets said upwardly angled frame extension and on the opposite end pinned to a mid-point on said vertical drive arms, said left and right main horizontal drive arms pinned at on end to said vertical drive arms and at the opposite end pinned to said left and right rear crank arms, said left and right rear crank arms fixedly connected at their opposite end to said central rear wheel hub, and said U shaped horizontal frame member fixedly attached at one end to the distal end of said main horizontal member and at the opposite end to said rear wheel hub.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION Of The INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
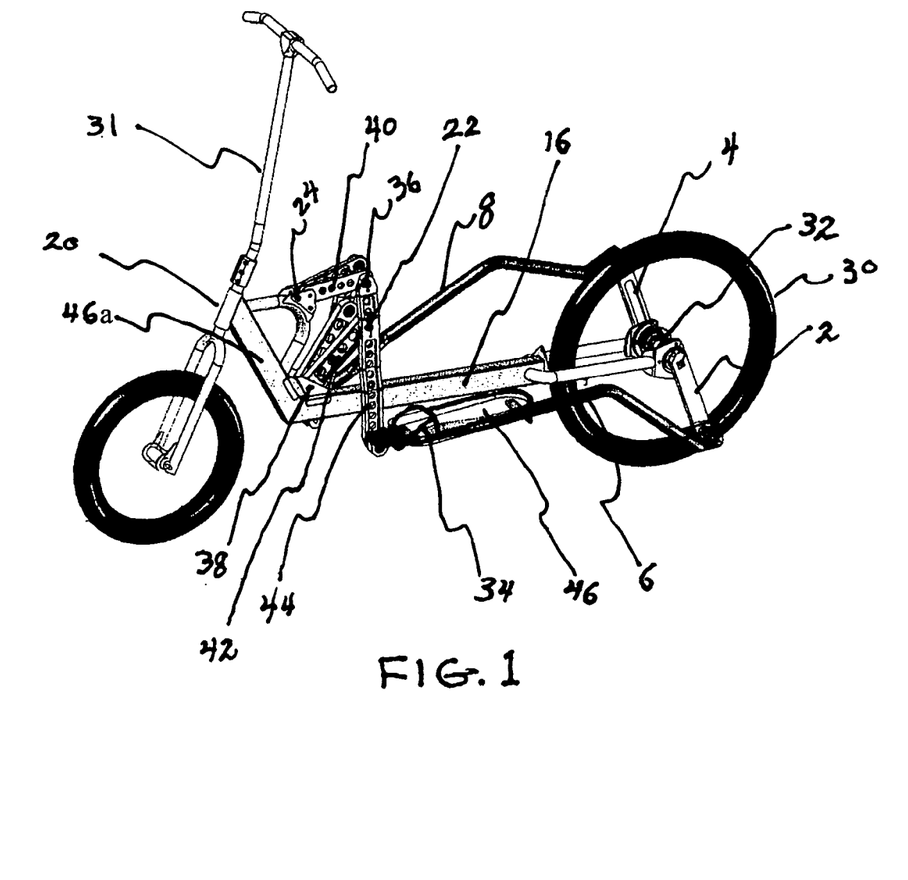
FIG. 1 is a perspective view of the invention
Figure 2:
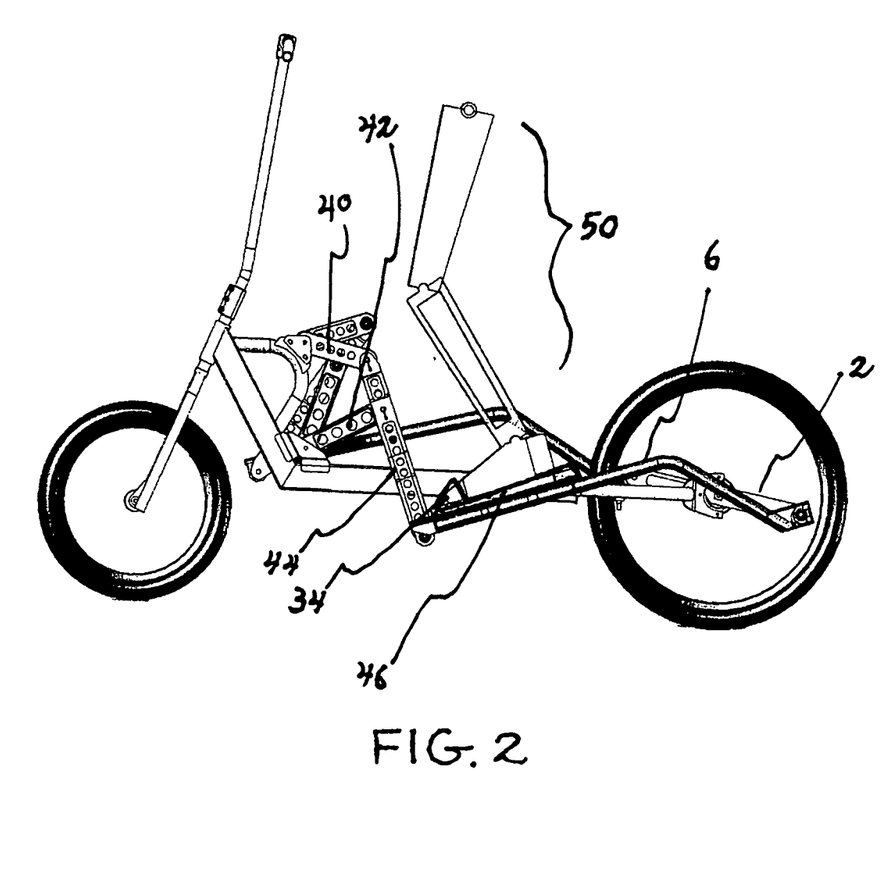
FIG. 2 is a side view of the invention with the crank arms at a three o'clock orientation.
Figure 3:
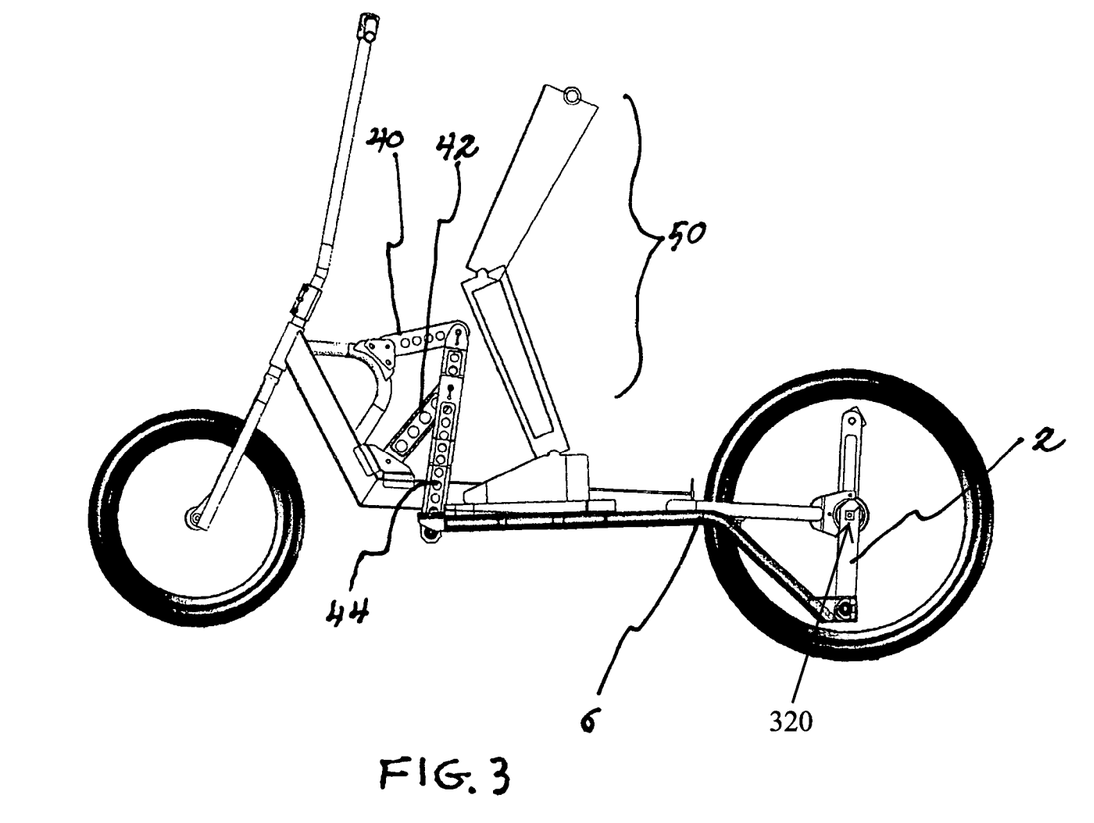
FIG. 3 is a side view of the invention with the crank arms at a six o'clock orientation.
Figure 4:
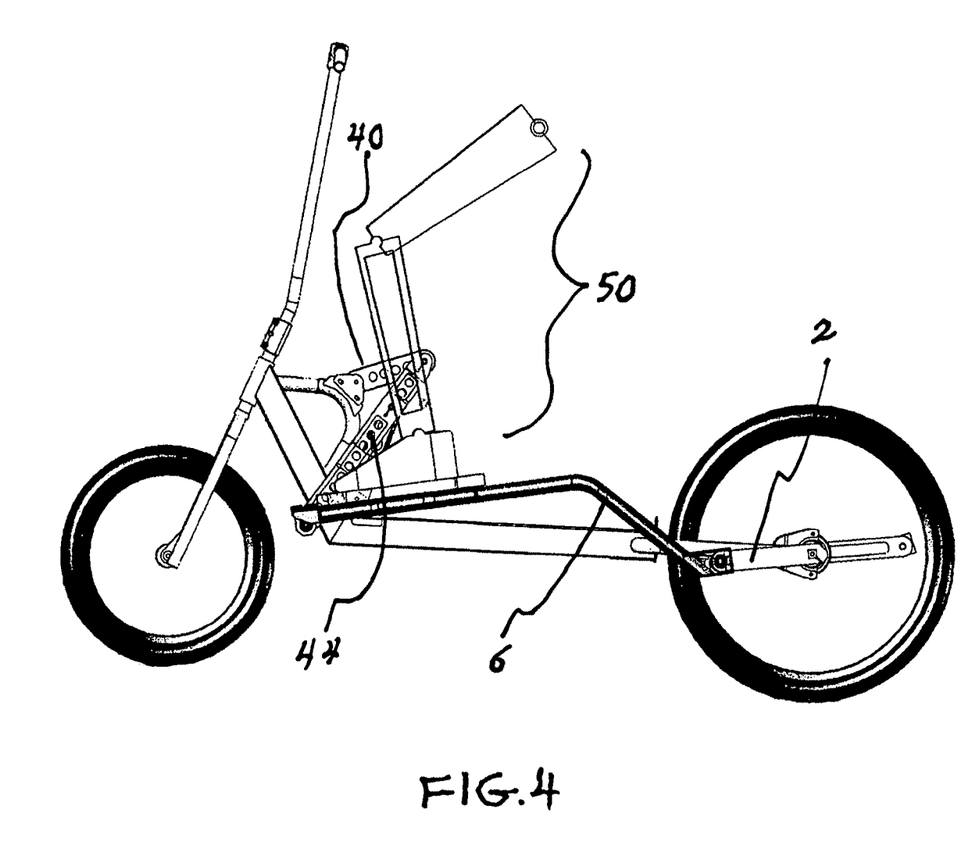
FIG. 4 is a side view of the invention with the crank arms at a nine o'clock orientation.
Figure 5:
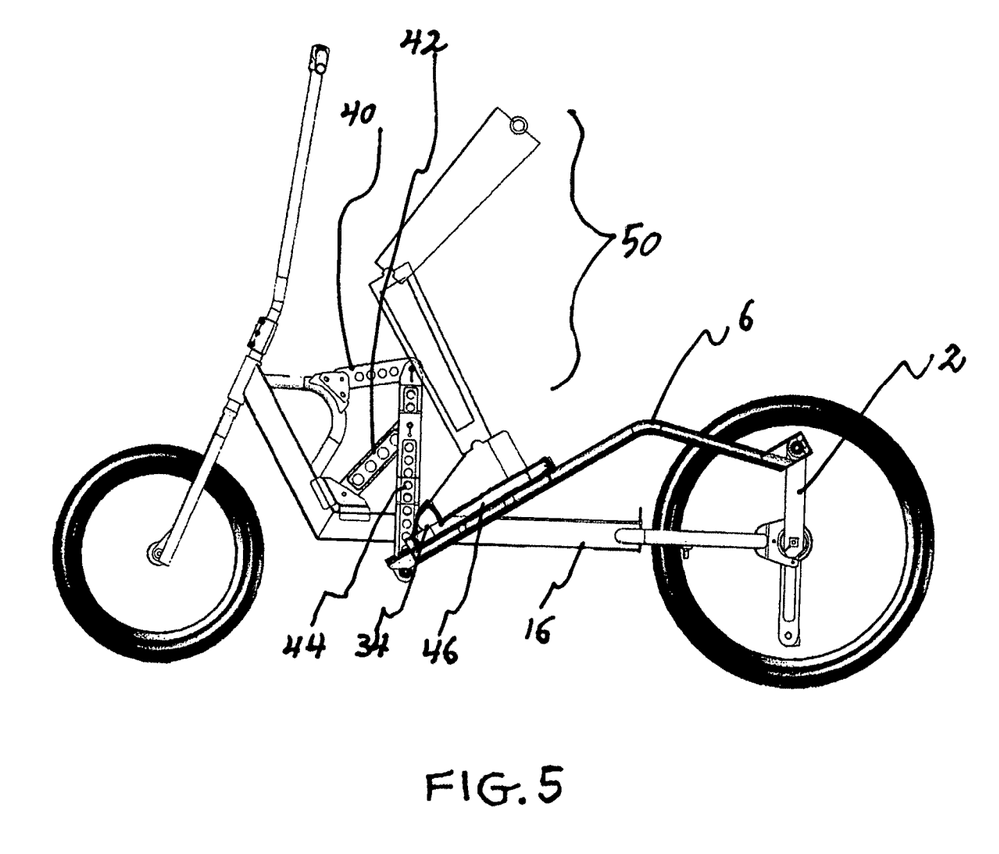
FIG. 5 is a side view of the invention with the crank arms at a twelve o'clock orientation.

FIG. 1 is a perspective view of the invention. The linkage of the present invention is attached to standard pneumatic wheels 30 and steering column 31. Left and right rear crank arms 2, 4 are fixedly attached to a shaft 320 of the central hub 32 of the rear wheel 30. The linkage shown in the present invention includes left and right identical components that mirror each other. However, for simplicity sake, the following description may in some cases refer to the right side linkage only, with the understanding that the left side linkage operates in a similar way. Main horizontal drive members 6, 8 are attached at one end to crank arms 2, 4 and at that opposite end to vertical linkage member 44. Vertical linkage members 44 are attached at their opposite ends to pivot shafts 36. A short horizontal linkage member 40 is attached at one end to pivot shaft 36 and at the opposite end to frame shaft member 24. The shafts 24, 36 act as pivot points during operation. Another lower short linkage member 42 is attached at one end to a shaft member 38 and at the opposite end to a mid-point shaft 22 on vertical linkage member 44. Linkage member 44 has a plurality of apertures at mid-point to receive pin 22, to allow different adjustment options which affect foot platform stroke path. Vertical linkage member 44 is made up of a lower member and an upper member that can be slidably adjusted to increase or decrease the length of the vertical member 44. A foot platform 46 is attached to the main horizontal drive member 6 and includes a toe retaining member 34 to help the user keep his feet on the platform 46 when the user lifts his or her foot during normal operation. The toe retaining member may be moved forward or backward depending on the user's shoe size. A main frame member 16 is attached to the rear hub assembly 32 via U shaped frame member 28. The main frame member 16 angles upward at its front end 46a and attaches to the front fork bearing housing 20. Steering column 31 extends from the bearing housing 20.

FIGS. 2,3,4,5 are side views of the invention that show the linkage of the present invention in operation in a succession of orientations, each Figure shows the crank arms 2, 4 at ninety degree intervals from one Figure to the next. The user's leg 50 can be seen in each phase of the rotational sequence. The linkage can be described as quadrilateral in that there are four linkage pivot points that cause effective operation of the elliptical stepper of the present design. The FIGS. 2, 3, 4, 5, show each element of the linkage 2, 16, 44, 42 in their respective locations at ninety degrees, one hundred and eighty degrees, two hundred and seventy degrees, and three hundred and sixty degrees.

Figure 6:
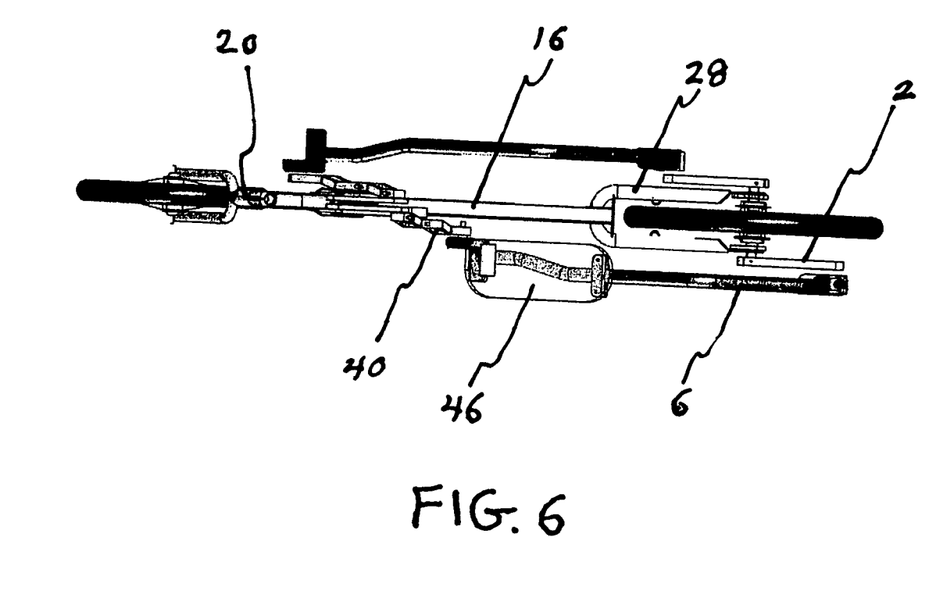
FIG. 6 is a top view of the invention.

FIG. 6 is a top view of the invention where the left and right mirror image linkage members can be seen.

The main horizontal drive member 6 remains a significant distance from the ground during all phases of the linkage cycle thereby making it ideal for use on rough terrain.

The elliptical motion for the step platform 46 during operation minimizes the vertical motion of the rider's feet, while guiding the feet in a natural motion, similar to that of walking.

Figure 7:
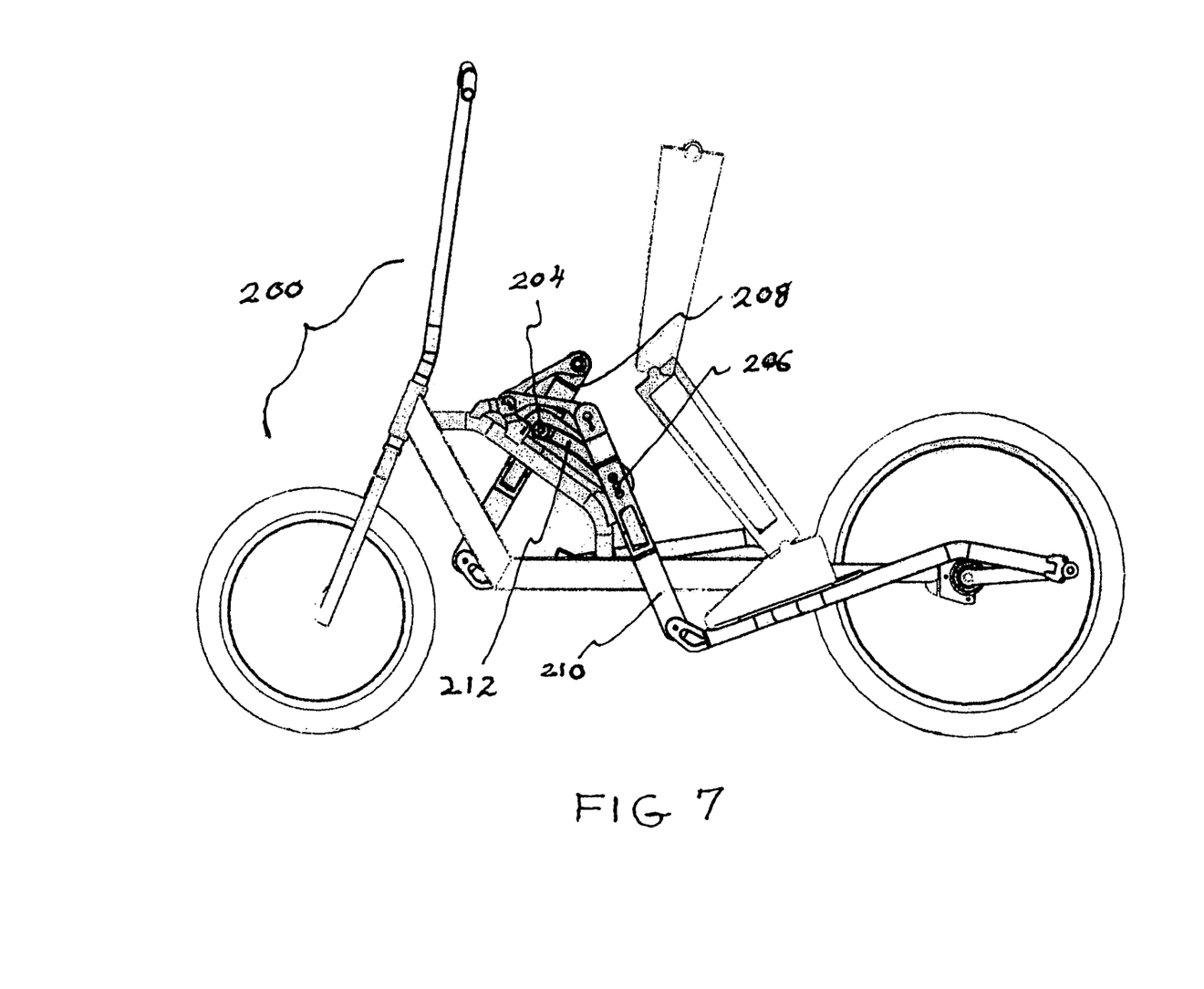
FIG. 7 is a side view of a second embodiment of the invention with crank arm at the five o'clock position.
Figure 8:
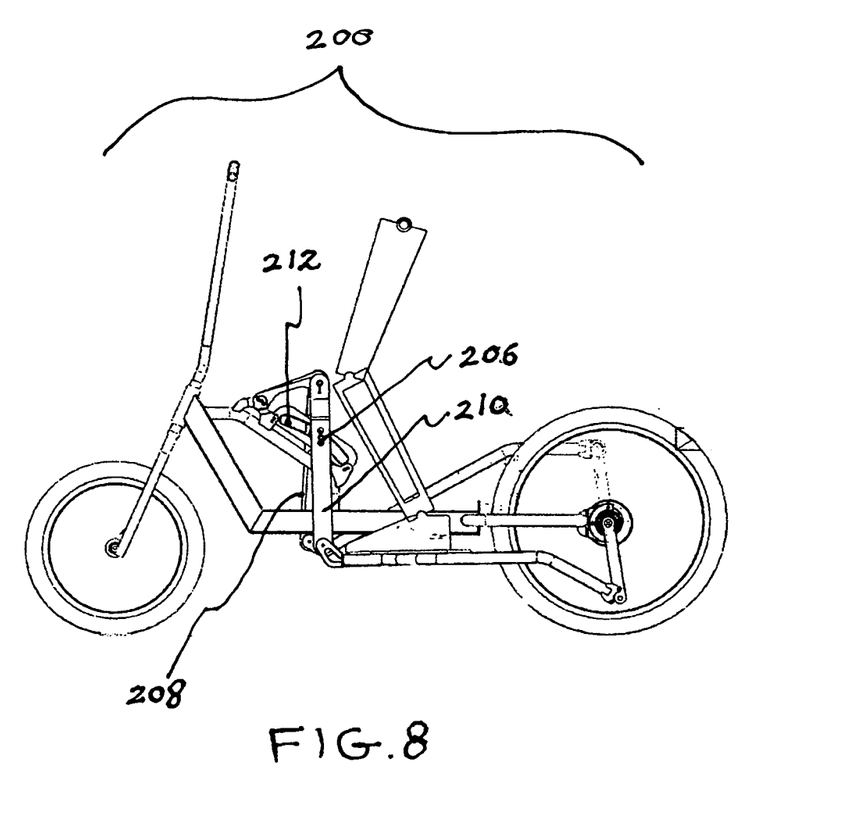
FIG. 8 is a side view of the second embodiment of the invention with the crank arm at the six o'clock position.

FIGS. 7 and 8 are each a side view of a second embodiment of the invention 200. In FIG. 7 the closest crank arm 210 is at five o'clock. FIG. 8 shows the crank arm 210 at six o'clock. This second embodiment 200 shows a left and a right curved roller track 212 that is more rigid and has less flex than the linkage of the first embodiment shown in FIGS. 1 through 6. In the second embodiment 200, the track 212 the mount position of the curved roller track 212 can be changed to achieve different pedal paths for increased comfort and efficiency. The changing curvature of the roller track 212 also makes possible many different pedal stroke paths. In operation, a roller members 204, 206 mounted in main vertical arms 208, 210 ride and slide within curved track 212, causing a smooth and efficient stroke path. The roller track 212 can also be straight in shape.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An elliptical drive system comprising:
   left and right rear crank arms;
   left and right pedal platforms;
   left and right main horizontal drive arms;
   left and right vertical drive arms;
   left and right short horizontal drive arms;
   left and right short lower drive arms;
   a main horizontal frame member having an integral upwardly angled frame extension;
   a U shaped horizontal frame member;
   a front fork and steering member; and
   a rear wheel hub;
   wherein said front fork and steering member is rotatably attached to said main horizontal frame member;
   said left and right short horizontal drive arms are rotatably attached to said integral upwardly angled frame extension;
   said left and right vertical drive arms are pinned to ends of said left and right short horizontal drive arms;
   said left and right short lower drive arms are pinned at an end to said main horizontal frame member where said main horizontal frame member meets said integral upwardly angled frame extension and on an opposite end pinned to a mid-point on said left and right vertical drive arms;
   said left and right main horizontal drive arms are pinned at an end to said left and right vertical drive arms and at an opposite end pinned to said left and right rear crank arms;
   said left and right rear crank arms are fixedly connected at their opposite end to a shaft of said rear wheel hub; and
   said U shaped horizontal frame member is fixedly attached on a side to a distal end of said main horizontal frame member and on an opposite end to said rear wheel hub.

2. The elliptical drive system of claim 1, wherein said left and right vertical drive arms are each comprised of an upper arm and a lower arm slidably engaged and pinned to each other.

3. The elliptical drive system of claim 1, wherein said left and right short horizontal drive arms, said left and right vertical drive arms, said left and right short lower drive arms and said left and right rear crank arms each have apertures that allow for adjustable pivot points that can accommodate different sized users.

4. The elliptical drive system of claim 1, wherein said elliptical drive system is a quadrilateral linkage.

5. An elliptical drive system comprising:
   left and right rear crank arms;
   left and right pedal platforms;
   left and right main horizontal drive arms;
   left and right vertical drive arms;
   left and right short horizontal drive arms;
   left and right curved roller tracks;
   rollers mounted on the left and right vertical drive arms, the rollers rolling along the left and right curved roller tracks;
   a main horizontal frame member having an integral upwardly angled frame extension;
   a U shaped horizontal frame member;
   a front fork and steering member; and
   a rear wheel hub;
   wherein said front fork and steering member is rotatably attached to said main horizontal frame member;
   said left and right short horizontal drive arms are rotatably attached to said integral upwardly angled frame extension;
   said left and right vertical drive arms are pinned to ends of said left and right short horizontal drive arms;
   said left and right main horizontal drive arms are pinned at an end to said left and right vertical drive arms and at an opposite end pinned to said left and right rear crank arms;
   said left and right rear crank arms are fixedly connected at their opposite end to a shaft of said rear wheel hub; and
   said U shaped horizontal frame member is attached on a side to a distal end of said main horizontal frame member and on an opposite end to said rear wheel hub.

6. An elliptical drive system comprising:
left and right rear crank arms;
left and right pedal platforms;
left and right main horizontal drive arms;
left and right vertical drive arms;
left and right short horizontal drive arms;
left and right short lower drive arms;
a main frame member having an integral upwardly angled frame extension;
a rear frame member;
a front fork and steering member; and
a rear wheel hub;
wherein said front fork and steering member is rotatably attached to said main frame member;
said left and right short horizontal drive arms are rotatably attached to said integral upwardly angled frame extension;
said left and right vertical drive arms are pinned to ends of said left and right short horizontal drive arms;
said left and right short lower drive arms are pinned at an end to said main frame member where said main frame member meets said integral upwardly angled frame extension and on an opposite end pinned to a mid-point on said left and right vertical drive arms;
said left and right main horizontal drive arms are pinned at an end to said left and right vertical drive arms and at an opposite end pinned to said left and right rear crank arms;
said left and right rear crank arms are fixedly connected at their opposite end to a shaft of said rear wheel hub; and
said rear frame member is attached on a side to a distal end of said main frame member and on an opposite end to said rear wheel hub.

\* \* \* \* \*